Feb. 4, 1930.  C. L. HOFF ET AL  1,745,797
TIRE CHAIN TREAD
Filed March 6, 1926
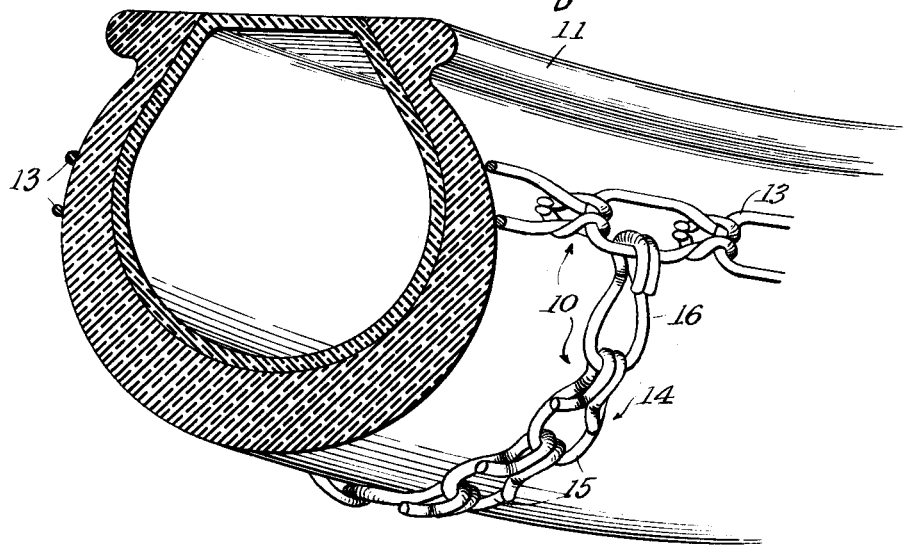
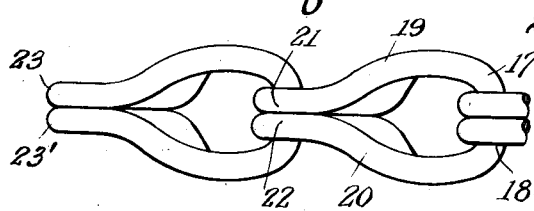
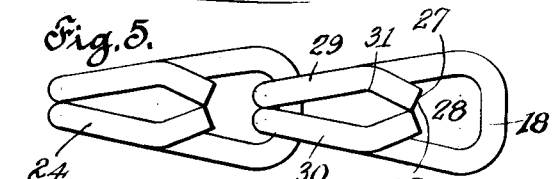
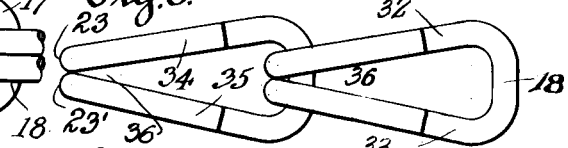
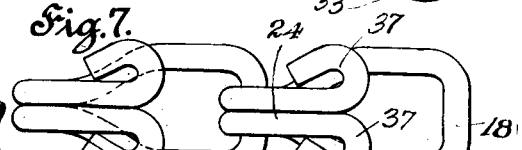
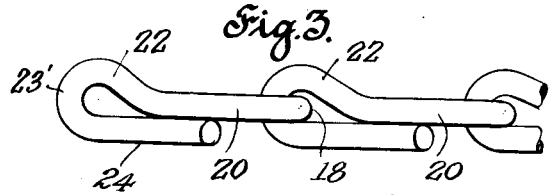
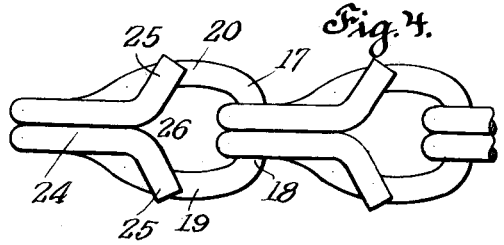
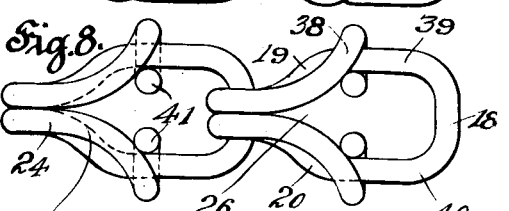
INVENTORS
Carlton L. Hoff
Sirardus S. Naugle
BY
Warren S. Orton.
ATTORNEY Patented Feb. 4, 1930

1,745,797

UNITED STATES PATENT OFFICE

CARLTON L. HOFF AND GIRARDUS G. NAUGLE, OF YORK, PENNSYLVANIA

TIRE-CHAIN TREAD

Application filed March 6, 1926. Serial No. 92,779.

The invention relates in general to a chain of general utility comprising inter-engaging links formed of single lengths of stock material; and the invention specifically relates to chain tire grips in which the wear members which extend across the tread portion of the tire are formed of chain links.

The object of the invention is to provide a simple form of chain which can be easily constructed with conventional forms of chain forming machinery; which will provide for a greater resistance to wear than has characterized similar forms of chains heretofore known, and to attain this advantage without the addition of material or parts except the use of a length of stock material slightly longer than has been used heretofore for the same size link.

In connection with the use of the improved form of chain as the tread members of a tire grip, the invention has for some of its objects the providing of an efficient traction effect and improved gripping engagement with the roadway; the providing of an anti-slipping means for minimizing tendencies to side slip and skidding of the tire, and of, major importance, to provide a substantially flat tread surface capable of assisting in braking the forward or backward movement of the vehicle when slowing to a stop, and incidentally providing greater wearing life than has been possible heretofore with similar chain constructions.

Various other objects and advantages of the invention will be in part obvious from an inspection of the accompanying drawings and in part will be more fully set forth in the following particular description of one form of device embodying our invention, and the invention also consists in certain new and novel features of construction and combination of parts hereinafter set forth and claimed.

In the accompanying drawing:

Fig. 1 is a perspective view of a fragmentary portion of a chain constituting a preferred embodiment of the invention and shown as part of a tire grip installed in position on the outside of a tire;

Fig. 2 is a plan view of two of the tread forming links shown in Fig. 1 looking down on the smooth side which is intended to engage the tire;

Fig. 3 is a view in side elevation of the links shown in Figure 2;

Fig. 4 is a plan view of the reverse, outer or roadway engaging side of the links shown in Figures 2 and 3;

Figs. 5, 6, 7 and 8 are plan views each showing the roadway engaging side of a pair of links and each corresponding for most of its parts to the link shown in the preferred form, in Figs. 1-4, and differing therefrom, and from each other, in the configuration of the extreme ends after they are brought back on the eye to form the wear portion of the links.

Referring first to the showing in Fig. 1 there is disclosed a chain grip 10 mounted on an automobile tire 11 and resembling conventional structures of tire chains in that it comprises a pair of side members 13 positioned on opposite sides of the tire. The side members are connected across the tread portion of the tire by a plurality of transversely extending, parallel, and circumferentially spaced tread chains of which one 14 is shown in Fig. 1 and the individual links 15 which particularly constitute the novel feature of this disclosure. The chains are connected at their ends to the side members by conventional form of fasteners 16.

Referring to the individual links in their features which are common to all of the forms illustrated, it is noted that each link is formed of a single length of stock material preferably round wire of the type usually used for this purpose. Each length of stock material is bent back on itself approximately adjacent its mid length to form a flat eye 17. This eye comprises a substantially straight crotch portion 18 constituting one end of the link and side reaches 19 and 20 which form the sides of the eye and are brought together, or at least towards each other, to form substantially parallel and preferably contacting neck portions 21 and 22. These neck portions are embraced on one side by the eye or rather the crotch portion of the eye of the next adjacent link in the chain. From the neck portions, each of the ends of the stock material, is bent back on itself in a plane perpendicular to the plane of the eye to form gripping hooks 23 and 23' encircling the eye of the next adjacent link as noted from the showing in Fig. 3 these hooks are closed on themselves to form eyes with openings sufficiently large to permit the intrusion therethrough of the notch 18. Each of the end portions beyond the hooks extends in overlapped relation with the eye, and is disposed in a plane parallel to and offset from the plane of the eye 17 as particularly shown in Fig. 3. In order to position these end portions parallel to and in contact with the eye and at the same time provide sufficient clearance in the hook to encircle the next adjacent eye, the neck forming portion and the hook forming portions are bent out of the plane of the eye as shown at the left end of each of the links in Fig. 3, before the end portions are bent to form the wear members 24 particularly featured in this disclosure. Differently expressed the hooks are positioned on one side of the wear members so as to leave the wear surfaces flat as suggested at the bottom of Fig. 3. It is suggested that these wear members be welded to the eye, preferably by spot welding at one or more points where contact is made, but there is no necessity under some conditions of use to weld or in any other way secure the overlapping parts of the link to each other.

In the preferred form shown in Figs. 1 to 4 inclusive, the extreme ends of the wear members are flared outward away from each other as indicated at 25 in order to provide in effect a wide spreading wear surface on the chain opposite the side in contact with the tire and which is in engagement with the roadway as shown in Fig. 1.

The wide spreading wear members form a Y-shaped wear surface as best shown when viewed in plane in Fig. 4 and the angle or V-opening 26 provides a wedging space for engaging stones or other roughness on the roadway and thus assist in preventing side slipping and skidding. In mounting the chains in position they are preferably disposed so that the V-openings on the rear wheels of the vehicle face in opposite transverse directions.

In the modified form of the invention shown in Fig. 5, the extreme ends 27 of the tread forming wear members are brought together approximately opposite the center of the opening 28 in the eye, and the wear members 29 and 30 between the ends thereof when used in plan as shown in this figure are spread apart as shown at 31 to provide a relatively wide wear surface with the ends of the stock material forming the same at least or almost in contact and preferably welded together.

In the form shown in Fig. 6, the side reaches 32 and 33 forming the sides of the eye are straight rather than curved, as shown in the preferred form. Both of these sides of the eye and the superposed wear members 34 and 35 constituting the wear surface provide therebetween a long sharp angle 36 with each part on opposite sides of the hook, 23 and 23', disposed parallel to and one on top of the other.

In the form shown in Fig. 7 the wear members are of the parallel and contacting form shown in Fig. 4 except that the free ends are curved sharply and outwardly from each other and bent back towards the parallel portions so that in this case the wide bearing surface is formed substantially of two eyes 37 disposed in the plane of the remaining straight parallel parts.

In the form shown in Fig. 8 the tread members 24 are flared outwardly as shown at 38 and are then bent around the adjacent side reaches 39 and 40 of the eye and in a plane perpendicular to the plane of the eye and transversely of the length of the eye to form eye fasteners 41. This form provides a secure connection between the eye and the wear members and there is therefore no necessity in this form of welding the same.

The form of link disclosed herein is intended to engage the tire surfaces and is formed of round stock material which has little, if any, deleterious effect on the tire. On the opposite side there is provided long lengths of material providing extensive wear surfaces.

The side of the chain provided with the Y-opening presents a rough and jagged construction which adds materially to resisting side slip and skidding. The broad somewhat flat surface provided by the disposing of the wear members in one plane gives a wide wear surface which is particularly effective in its braking action on icy surfaces and on car tracks. The ends of the wear members in the several forms provide exposed sharp edges to the roadway and have a tendency to bite into the same. These ends are particularly effective in preventing side slipping on icy pavements.

Having thus described our invention, we claim:

1. A chain link formed of a single length of stock and comprising an eye, connected substantially parallel neck portions, hooks rounding from the neck portions in parallel planes perpendicular to the pane of the eye, and the end portions of said hooks forming continuations of the hooks, lapping the eye, disposed in a plane parallel to the plane of the eye and engaging the side of the eye.

2. A chain link comprising a flat eye, wear members disposed parallel to the plane of the eye and contacting with the sides of the eye, the ends of the wear members each extending at an angle to the part of the eye adjacent the same.

3. A cross chain adapted to extend transversely across the tread portion of a tire, comprising a plurality of interlocking links, each of said links being formed of round stock and having a flat tire engaging eye presenting smooth rounded surfaces to the tire and substantially parallel neck portions in substantial contact with each other and embraced by the eye of another link and gripping hooks engaging the eye of the adjacent link, portions of the stock forming the hooks being extended therefrom in a plane substantially parallel to and offset from the plane containing the eye to provide a relatively extensive area of engagement with the roadbed and forming blunt end road engaging members tending to prevent side slipping of the tire.

Signed at York, in the county of York and State of Pennsylvania this 4th day of March, A. D. 1926.

CARLTON L. HOFF.
GIRARDUS G. NAUGLE.